United States Patent [19]

Dasgupta et al.

[11] Patent Number: 5,547,782
[45] Date of Patent: Aug. 20, 1996

[54] CURRENT COLLECTOR FOR LITHIUM ION BATTERY

[76] Inventors: Sankar Dasgupta, c/o Electrofuels Manufacturing Co. 21 Hanna Ave., Toronto, Ont., Canada, M6K 1W8; James K. Jacobs, c/o Electrofuel Manufacturing Co. Unit 10, 21 Hanna Ave., Toronto, Canada, M6K 1W8

[21] Appl. No.: 402,359

[22] Filed: Mar. 13, 1995

Related U.S. Application Data

[62] Division of Ser. No. 204,439, Mar. 2, 1994, Pat. No. 5,464,706.

[51] Int. Cl.[6] .................................................. H01M 4/66
[52] U.S. Cl. .......................... 429/194; 429/235; 429/237; 429/245
[58] Field of Search ................................. 429/245, 235, 429/237, 233, 194, 209

[56] References Cited

U.S. PATENT DOCUMENTS

| | | | |
|---|---|---|---|
| 4,818,647 | 4/1989 | Plichta et al. | 429/218 |
| 5,368,959 | 11/1994 | Koksbang et al. | 429/212 |
| 5,441,830 | 8/1995 | Moulton et al. | 429/245 X |

Primary Examiner—John S. Maples

[57] ABSTRACT

An improved lithium ion battery is described wherein corrosion of the current collector in contact with the electrode face is greatly reduced. In one embodiment an electrically conductive, ceramic layer is inserted between the current collector and the corresponding major face of the lithium ion battery. In another embodiment the metallic current collector plate is replaced by an electrically conductive laminated organic polymer having electrically conductive particles dispersed therein.

5 Claims, 2 Drawing Sheets

CURRENT COLLECTOR FOR LITHIUM ION BATTERY

This is a division of application Ser. No. 08/204,439 filed Mar. 2, 1994, now U.S. Pat. No. 5,464,706.

FIELD OF THE INVENTION

This invention relates to electrochemical batteries, more particularly to current collectors in lithium ion batteries.

BACKGROUND OF THE INVENTION

Electrochemical batteries are generally used to provide direct current and power in a large variety of different operations. Batteries utilizing the reactivity of lithium metal have been known. It has been, however, observed that the operation of a battery incorporating lithium metal in elemental form may become hazardous under certain circumstances. Further research in this field lead to the development of lithium ion batteries in which elemental lithium is replaced by substances intercalating lithium ions. Such intercalating substances are capable of absorbing substantial amounts of lithium ions and reversibly releasing the lithium ions in a subsequent operation.

A conventional lithium ion battery has a negative electrode comprising an active material which releases lithium ions when discharging and intercalates or absorbs lithium ions when the battery is being charged. The positive electrode of a lithium ion battery comprises an active material of a different nature, one that is capable of reacting with lithium ions on discharge, and releasing lithium ions on charging the battery. In some of the conventional lithium ion batteries the negative electrode is separated from the positive electrode by a perforated or microporous membrane or continuous layer, made of some suitable organic polymer. The external faces of the electrodes are usually equipped with some means to collect the charge generated by the battery during discharge, and to permit connection to an external power source during the recharging of the lithium ion battery. The current collectors are usually made of stainless steel, iron-nickel alloys, copper foil, aluminum and similar relatively inexpensive metals. The conventional lithium ion battery also comprises a lithium ion containing electrolyte, which may be either a non-aqueous liquid or a solid organic polymer, the lithium ion therein being supplied by dissociation of a lithium salt dissolved in the electrolyte. An exemplary lithium ion battery is described in U.S. Pat. No. 5,187,033, issued to N. Koshiba on Feb. 17, 1993.

As referred to above, when the level of performance of a lithium ion battery falls below that desired the battery may be recharged. The useful life of a rechargeable or of a secondary battery is determined by the number of times it may be recharged without noticeable deterioration in its performance. It is known that ionic movement in the proximity of the current collector of a battery may cause corrosion of the current collector. More particularly, corrosion of the current collector in contact with the electrodes of a lithium ion battery may be the result of one or more of the following phenomena: the highly reactive nature of lithium ions, high potentials encountered during recharging of a lithium battery, relatively low corrosion resistance of the metals utilized as current collectors in lithium ion batteries and events of similar nature. It is to be noted that the current collector working in conjunction with the positive electrode is more prone to corrosion, however the current collector in contact with the negative electrode may also be corroded. A corroded current collector may lead to uneven battery power delivery, or even to complete breakdown in the performance of the battery. It is therefore of great importance that corrosion of the current collector is minimized in the charge and discharge operations of a lithium ion battery in order to ensure a long and useful battery life.

U.S. Pat. No. 5,187,033 utilizes in one of its embodiments fine powder of non-corrodible conductive metals mixed with the active material to diminish corrosion of the current collector. The non-corrodible metal in the lithium ion battery of U.S. Pat. No. 5,187,033 is silver or platinum, which may be used in conjunction with fine carbon also incorporated with the active material. In another embodiment of U.S. Pat. No. 5,187,033 silver or platinum is plated on the current collector facing the negative electrode. The plating may be replaced by a net of platinum and silver. It is assumed that unless the silver or platinum layer is of measurable thickness, this type of corrosion protection is likely to break down early in the life of the lithium ion battery. Silver or platinum of measurable thickness may substantially increase the cost of production of lithium ion batteries.

U.S. Pat. No. 5,262,254 issued to Koksbang et al. on Nov. 16, 1993, describes an electrically conductive organic polymer layer placed between the positive electrode and the metallic current collector of a lithium ion battery. Koksbang et al. list several organic compounds which may be utilized in obtaining an electrically conductive organic polymer corrosion protective layer inserted within a lithium ion battery. In another embodiment of Koksbang et al. both sides of the metallic current collector in the proximity of the electrode are enclosed in an electrically conductive organic polymer film or layer. It is considered that the cost of production of lithium ion batteries may be substantially increased by incorporating relatively expensive electrically conductive organic polymers therein. Moreover, the conductivity of such organic polymers is usually less than that of conventionally used metallic current collectors.

There is a need for a relatively inexpensive method to diminish, and preferably eliminate corrosive interaction between the active material and the current collector in lithium ion batteries.

SUMMARY OF THE INVENTION

An improvement in lithium ion batteries has been found whereby an electrically conductive, continuous and coherent ceramic layer made of titanium or zirconium nitride, is inserted between the current collector and the face of the electrode in contact with the current collector. The ceramic layer may be inserted between the positive electrode and the respective current collector, or between each electrode and its respective current collector.

In another embodiment of the invention the current collector adjacent to the positive electrode of the lithium ion battery, is a non-metallic, electrically conductive, coherent, laminated organic polymer having fine carbon, carbon fibres or electrically conductive ceramic particles dispersed therein, in amounts sufficient to render the polymer layer electrically conductive.

Figure 1:
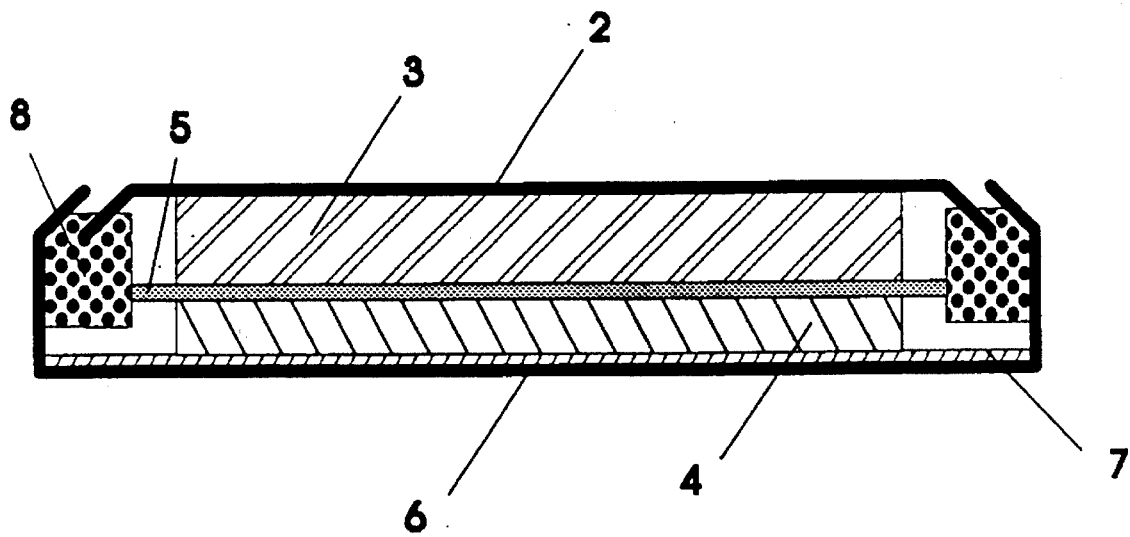
FIG. 1 is a schematic representation of the vertical cross section of a coin-shaped lithium ion battery having an electrically conductive, continuous, ceramic layer incorporated in the battery.

The preferred embodiments of the invention will now be described with reference to the drawings.

DETAILED DESCRIPTION OF THE PREFERRED EMBODIMENTS

Conventional coin-shaped lithium ion batteries are contained in a button-shaped metallic casing and a metallic cover plate. The casing and the plate are usually separated by an insulator, sometimes referred to as a grommet or gasket. The casing usually serves as the positive current collector, and the metallic cover plate is usually the negative current collector. As has been briefly discussed hereinabove, the positive electrode comprising the positive active material is located adjacent to the positive current collector, and the negative electrode comprising the negative active material is placed in the proximity of the negative current collector. The positive electrode of a conventional lithium ion battery contains a substance capable of reacting chemically or interstitially with lithium ions, such as transition metal oxides, including vanadium oxides, cobalt oxides, iron oxides, manganese oxide and such like, usually forming solid solutions with one another. Carbon and binding resins may also be incorporated in the positive electrodes of conventional lithium ion batteries. In general, the positive active material comprised by the positive electrode will react with lithium ions in the discharging step of the battery, and release lithium ions in the charging step of the battery. The conventional negative electrode usually contains active materials which will release lithium ions on discharge and intercalate lithium ions on charging. The negative active materials commonly utilized in lithium ion batteries include niobium pentoxide, carbon and similar materials capable of intercalating lithium ions. It is to be noted that in most conventional lithium ion batteries lithium is not present in elemental form, nor as a simple alloy with other metals.

Lithium ion batteries usually comprise a nonaqueous liquid or a solid polymer electrolyte which has a lithium salt dissolved therein, capable of dissociating to lithium ion(s) and an anion, such as for example lithium perchlorate, lithium borohexafluoride and other lithium salts soluble in the electrolyte utilized. The positive electrode of a conventional lithium ion battery comprises a positive active material intermixed with the non-aqueous electrolyte, often a binder and other additives. Similarly, the negative electrode comprises a negative active material mixed with the electrolyte and other additives. As has been mentioned above, the negative electrode bearing negative active materials, and the positive electrode bearing positive active materials, may be separated by a separator of some kind, usually a perforated or microporous organic polymer membrane allowing the passage of lithium ions therethrough. The negative and the positive electrodes, respectively, are located on opposing sides of the separator membrane. In conventional coin-shaped lithium ion batteries each electrode is disc-shaped having two parallel major faces. Current collectors are placed in close proximity to the respective external faces of the negative and positive electrodes. The current collectors on the external faces of the lithium ion battery assembly are usually separated from one another by an insulator. The insulator is usually a gasket or a grommet in case of coin-shaped lithium ion batteries, as mentioned above.

Lithium ion batteries may also be assembled as a thin plate-like article having the same essential components as the coin-shaped battery. It is to be noted that the contact areas in a plate-like battery are substantially greater in relation to their thickness. In general, conventional lithium ion batteries may take any convenient shape, however, they all comprise the above described component elements.

It is well known that lithium is a very reactive substance, and the mobile lithium ions either in discharging or charging of the battery are likely to react with and corrode the current collectors. As was discussed hereinabove, it is therefore desirable to place a corrosion protector layer between the electrode and the metallic current collector.

It is of essence that the corrosion protector layer is both resistant to corrosion by lithium and capable of conducting electricity so that the mobility of the charge carrier between the current collector and the electrode is not impeded. It is understood that a suitable corrosion protector layer will have less than 1 milliohm.cm resistance (or greater than $10^{-3}$ S/cm conductivity). The preferred resistance is less than $10^2$ ohm.cm.

It has now been found that an electrically conductive ceramic layer placed between the current collector face in contact with the electrode will substantially reduce corrosion of the current collector of a lithium ion battery. Ceramic substances are usually hard, have high melting point, resist corrosion and may often be produced at relatively low cost. A ceramic substance suitable for use in a lithium ion battery as being conductive and resistant to corrosion was found to be titanium nitride or zirconium nitride. It is to be noted that any other ceramic material which is electrically conductive and may be obtained in the form of layers may also be used for the above purpose. The ceramic layer has to be essentially pore-free, that is continuous and coherent, in order to provide maximum corrosion protection. The thickness of the layer will be determined by a convenient balance between strength, relatively low electrical resistance and relatively high corrosion protection. It is preferred that the ceramic layer be of uniform thickness.

The corrosion protector layer may be adherent to the metallic collector or it may constitute a separate self-supporting layer, which is placed in close proximity to the metallic collector between the corresponding face of the metallic current collector and the electrode. The corrosion protector layer should be a continuous entity within the battery and any interruption of its continuity is to be avoided. The preferred corrosion protector layer has no or only few unavoidable micropores.

An adherent ceramic layer may be conveniently produced by chemical vapour deposition (CVD) or by sputtering of the ceramic substance, such as titanium nitride or zirconium nitride, onto a metallic plate or foil. Other methods of obtaining an adherent ceramic layer may include applying a coating of the ceramic substance as an emulsion or suspension to a metallic plate, and subsequently eliminating the carrier by usual means. A ceramic layer may also be produced by flame or plasma spraying, but any conventional method by which a continuous and coherent ceramic layer can be obtained may be utilized. As discussed hereinabove the thickness of the layer is determined by convenience but it has been found that the preferred layer thickness is less than 0.7 mm. The metallic plate may be any metal conventionally used as metal current collector in a lithium ion battery, be it coin-shaped, thin flat-packed, spirally wound tube or any other appropriate shape.

Another embodiment designed to avoid corrosion of the current collector of a lithium ion battery is the replacement of the metallic collector by an electrically conducting, continuous and coherent laminated polymer. This embodiment is particularly suitable for applications in thin flat-packed forms of lithium ion batteries. The laminated polymer is rendered electrically conductive by dispersing an electrically conductive ceramic substance, for instance fine powder of titanium nitride or zirconium nitride, or a carbonaceous filler of small particle size, such as fine carbon, graphite platelets, carbon black, or carbon fibres, in the polymer prior to lamination. The preferred polymer is polypropylene or polyethylene. The average particle size of the conductive ceramic or fine carbon, or plate thickness of the graphite, or diameter of the fibres, is conveniently smaller than the layer thickness of the laminated polymer, and preferably less than half the thickness of the laminated polymer. It was found that the convenient loading of the polymer with electrically conductive particles was in excess of 35 vol %.

In the preferred embodiment the laminated polymer loaded with one of the above described electrically conductive substances, is cut to completely cover and preferably overlap the major face of the positive electrode. The metallic collector plate of the negative electrode may also be replaced by an electrically conductive, continuous and coherent laminated polymer if so desired.

EXAMPLE 1

A 3 inch×2 inch area of a 302 stainless steel sheet was coated by means of chemical vapour deposition (CVD) method with titanium nitride. The coating thickness was 10 µm.

A conventional coin-shaped lithium ion battery was assembled utilizing the titanium nitride coated stainless steel sheet as the casing of the battery and its positive current collector. The coin-shaped lithium battery is shown on FIG. 1, where 2 represents a stainless steel current collector cover plate. The inner face of the cover plate is in contact with the negative electrode 3. The negative electrode is made up of a mixture of carbon particles intercalating lithium ions, fine particles of polypropylene containing lithium perchlorate and convention additives. Numeral 4 represents the positive electrode of the battery, composed of lithium enriched cobalt oxides mixed with conventional additives. Adjacent faces of the negative and positive electrodes are separated by a porous polypropylene sheet 5. The stainless steel casing 6 has a continuous, coherent titanium nitride layer 7 on its inner face, obtained as described above. The titanium nitride layer is in contact with the external face of the positive electrode disc 4. Gasket 8 insulates the cover plate from the steel casing 6.

It was found that the current collector of the coin-shaped lithium ion battery schematically shown on FIG. 1 showed no sign of corrosion after more than 300 cycles of discharging and charging.

Figure 3:
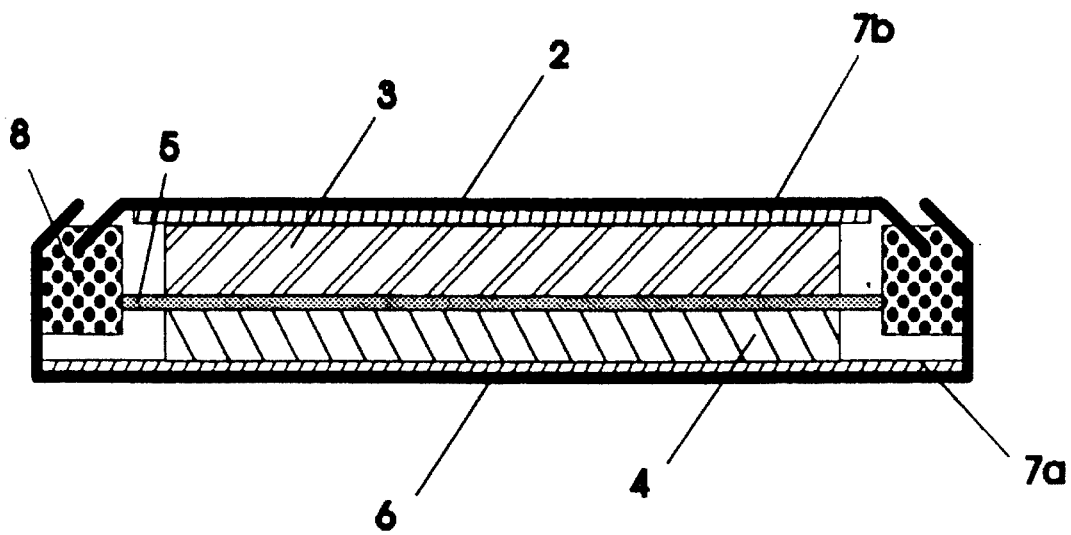
FIG. 3 shows a similar coin-shaped lithium ion battery having a second electrically conductive, continuous, ceramic layer inserted adjacent to the negative electrode.

Another coin-shaped lithium ion battery, similar to that of FIG. 1, is shown schematically on FIG. 3, having current collectors bearing titanium nitride layers 7a and 7b, adjacent to the respective external face of the positive and the negative electrode.

Figure 4:
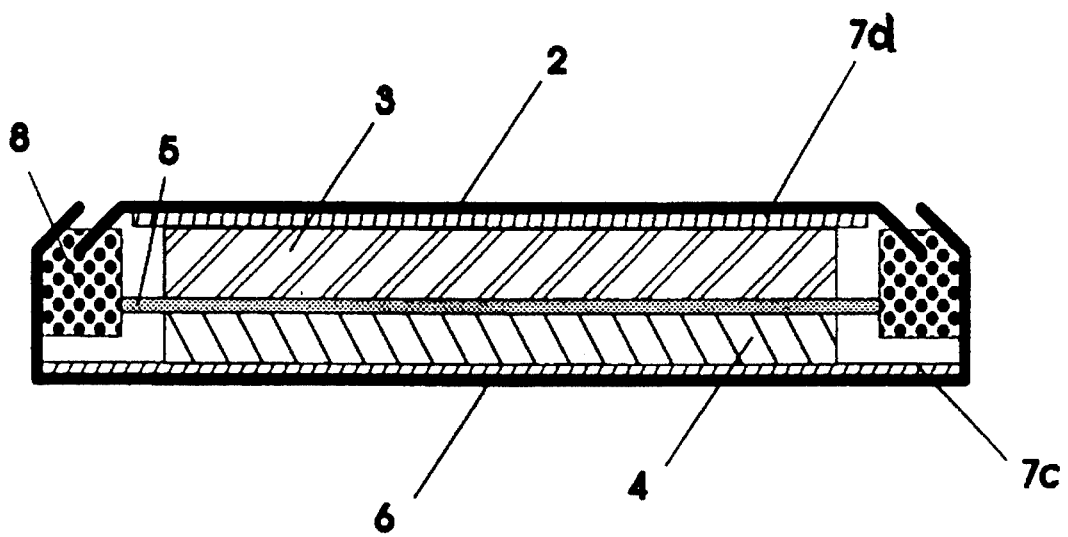
FIG. 4 shows another coin-shaped lithium ion battery, having an electrically conductive polymer layer inserted adjacent to each electrode.

Yet another coin-shaped lithium battery is shown schematically on FIG. 4, having electrically conductive polymer layers 7c and 7d, adjacent the respective external face of the positive and negative electrode.

EXAMPLE 2

A flat-packed lithium ion battery having electrodes and separator sheet of the same composition as described in Example 1, was assembled. The flat-packed lithium battery was supported on a stainless steel sheet which also served as its negative current collector. The current collector in contact with the positive electrode of the flat-packed lithium battery was a tape cast and rolled 100 µm thick polypropylene sheet. The polypropylene sheet contained 50 vol. % fine carbon particles and was found to be a good and stable electrical conductor, which was also wear resistant.

Figure 2:
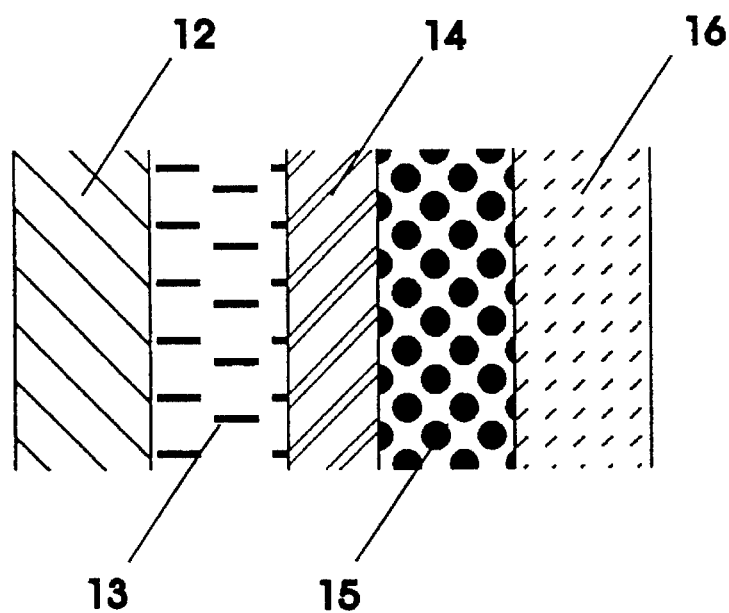
FIG. 2. is a schematic diagram of a flat plate-like lithium ion battery having an electrically conductive carbon-loaded laminated polymer current collector.

The structure of the flat-packed lithium ion battery is schematically shown on FIG. 2, where 12 is the metallic current collector, 13 is the negative electrode, 14 is the porous separator, and 15 is the positive electrode. Numeral 16 represents the fine carbon loaded polypropylene current collector sheet.

The above flat-packed lithium ion battery was found to perform well and gave prolonged service.

It has been shown that providing a ceramic layer on or in the proximity of the current collector can improve the performance and extend the useful life of a lithium ion battery by suppressing corrosion of the metallic current collector plate. A ceramic layer can be placed on each major face of the current collector if so desired. The generated charge may be collected by electrical conductor leads, such as lugs or wires or similar known means, attached to the current collector. Obviously, the conductor leads may be also used to recharge the battery.

In the other embodiment of the invention described hereinabove the metallic current collector plate of the conventional lithium ion battery has been successfully replaced by a polymer layer loaded with electrically conductive carbonaceous or electrically conductive ceramic particles. The generated charge can be collected by attaching conventional electrical leads directly to the electrically conductive polymer layer or placing a metallic plate on the external face of the conductive polymer. Alternatively, the electrically conductive polymer may be wrapped around and completely enclose a metallic plate equipped with electrical leads, acting as charge collector. The metallic charge collector thus will not come in contact with any corrosive component of the lithium ion battery.

Although the present invention has been described with reference to the preferred embodiment, it is to be understood that modifications and variations may be resorted to without departing from the spirit and scope of the invention, as those skilled in the art will readily understand. Such modification and variations are considered to be within the purview and scope of the invention and the appended claims.

We claim:

1. In a lithium ion battery, having a positive electrode comprising a positive active material capable of reacting with lithium ions in discharging said battery and releasing lithium ions in charging said battery, said positive electrode having two opposing major faces, a negative electrode comprising a negative active material capable of releasing lithium ions in discharging said battery and intercalating lithium ions in charging said battery, said negative electrode having two opposing major faces, a non-aqueous electrolyte containing a lithium salt capable of ionic dissociation, a first current collector in contact with a distal major face of said positive electrode, a second current collector in contact with a distal major face of said negative electrode, and metallic electrical lead means in juxtaposed contact position with the external face of each of said current collectors, the improvement comprising that said first current collector in contact with said distal major face of said positive electrode is an electrically conductive, continuous and coherent polymer layer, said polymer layer consisting essentially of an electrically non-conductive, continuous and coherent polymer laminate having a thickness, and said continuous and coherent polymer laminate is having dispersed therein more than 35 vol. % electrically conductive particles selected from the group consisting of titanium nitride, zirconium nitride, fine carbon, carbon black and carbon fibres, said conductive particles having major and minor dimensions.

2. An improved lithium ion battery as claimed in claim 1, wherein the average minor dimension of said electrically conductive particles dispersed in said electrically non-conductive continuous and coherent polymer laminate is less than the thickness of said continuous and coherent polymer laminate.

3. An improved lithium ion battery as claimed in claim 1, wherein said thickness of said electrically non-conductive, continuous and coherent polymer laminate is less than 300 μm.

4. An improved lithium ion battery as claimed in claim 1, further comprising that said second current collector in contact with said distal major face of said negative electrode is a second electrically conductive, continuous and coherent polymer layer, said second electrically conductive, continuous and coherent polymer layer consisting essentially of an electrically non-conductive, continuous and coherent polymer laminate having a thickness, and said second continuous and coherent polymer laminate is having dispersed therein more than 35 vol. % electrically conductive particles selected from the group consisting of titanium nitride, zirconium nitride, fine carbon, carbon black and carbon fibres, said conductive particles having major and minor dimensions.

5. An improved lithium ion battery as claimed in claim 4, wherein said thickness of said second electrically non-conductive, continuous and coherent polymer laminate is less than 300 μm.

* * * * *